No. 820,331. PATENTED MAY 8, 1906.
J. N. ANDERSON.
REVERSING SWITCH.
APPLICATION FILED JUNE 23, 1905.

WITNESSES:

INVENTOR
John Norman Anderson
BY
ATTORNEYS

UNITED STATES PATENT OFFICE.

JOHN NORMAN ANDERSON, OF NEW YORK, N. Y., ASSIGNOR TO CHARLES W. HOFFMAN, OF NEW YORK, N. Y.

REVERSING-SWITCH.

No. 820,331.   Specification of Letters Patent.   Patented May 8, 1906.

Application filed June 23, 1905. Serial No. 266,561.

*To all whom it may concern:*

Be it known that I, JOHN NORMAN ANDERSON, a citizen of the United States, and a resident of the city of New York, borough of Manhattan, in the county and State of New York, have invented a new and Improved Reversing-Switch, of which the following is a full, clear, and exact description.

My invention relates to reversing-switches and admits of general use, but is of peculiar value in connection with electric elevators and analogous structures in which the general direction of rotation is required to be changed at will.

Reference is to be had to the accompanying drawings, forming a part of this specification, in which similar characters of reference indicate corresponding parts in all the figures.

Fig. 8 is a detail section upon the line 8 8 of Fig. 6 looking in the direction of the arrow and showing the manner in which certain sleeves are mounted upon the actuating-shaft.

Figure 5:
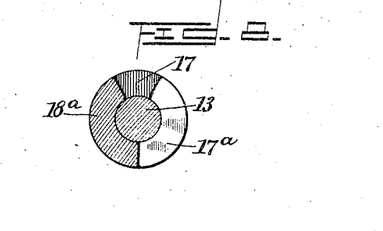
Fig. 5 is a fragmentary vertical section upon the line 5 5 of Fig. 1 looking in the direction of the arrow.

Upon a metallic base 9 is mounted a pair of bearing-posts 10, provided with bearings 11 12, which support the actuating-shaft 13, this shaft being adapted to rock back and forth for a distance approximating half a revolution. A plate 14 of insulating material is mounted upon the base 9 and serves to support various parts hereinafter mentioned. Mounted loosely upon the actuating-shaft 13 is a sleeve 15, provided with a projecting lug 15ª. A sleeve 16 is mounted rigidly upon the actuating-shaft 13 and is provided with a projecting lug 16ª. The relation of the sleeves and lugs can best be seen in Fig. 5. Mounted loosely upon the actuating-shaft 13 are a pair of comparatively short sleeves 17 18, and abutting the sleeve 18 is a comparatively long sleeve 19, which I call the "quick-break" sleeve. This sleeve is provided with a cam 20, secured rigidly thereupon. Engaging this cam is a roller 21, carrie. by an arm 22, the latter being journaled upon a pivot 23 and connected with a spring 24, which is secured upon a pin 25, so as to draw the arm 22 toward the actuating-shaft 13. In order to afford a good engagement between the spring 24 and the arm 22, the latter is provided with a pin 26.

Figure 1:
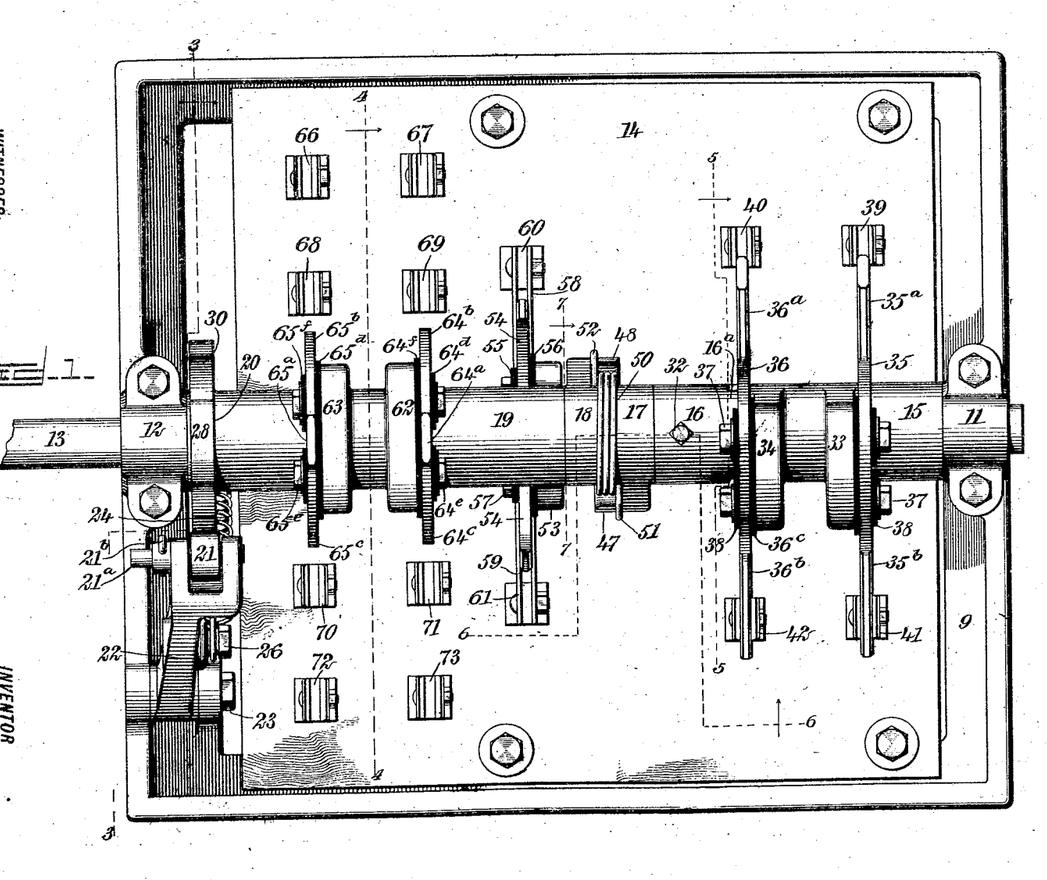
Figure 1 is a plan view of the reversing-switch, the actuating-shaft being partly broken away.
Figure 2:
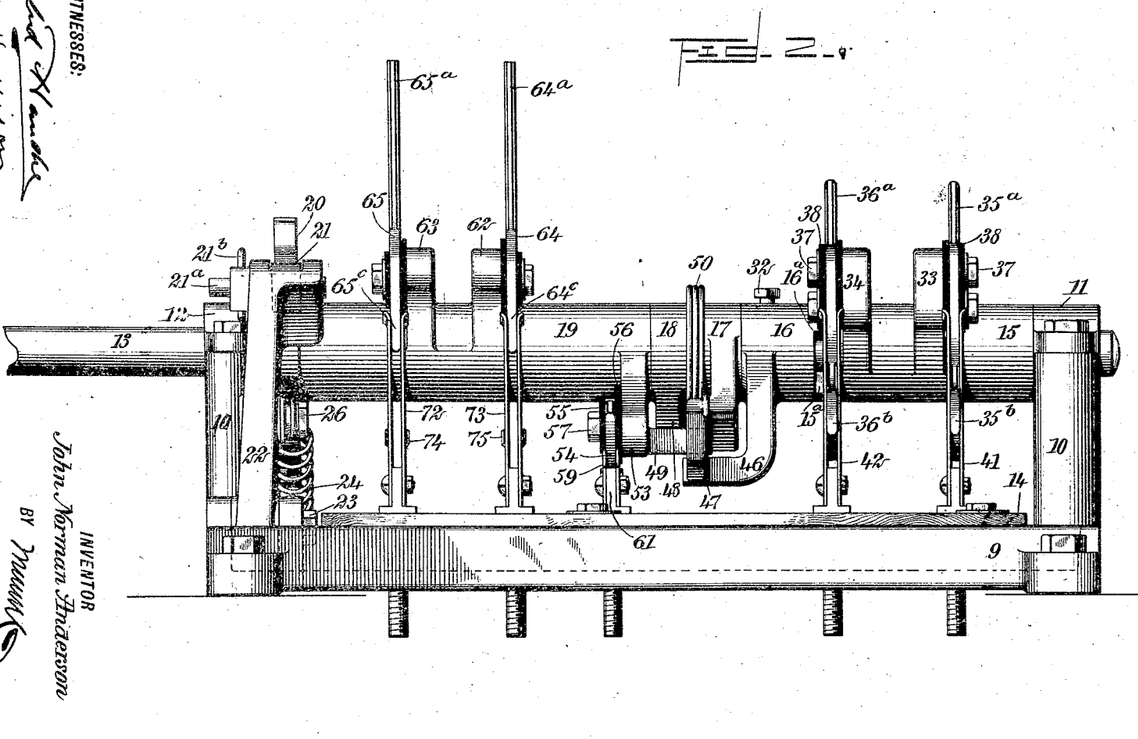
Fig. 2 is a side elevation of the same.
Figure 6:
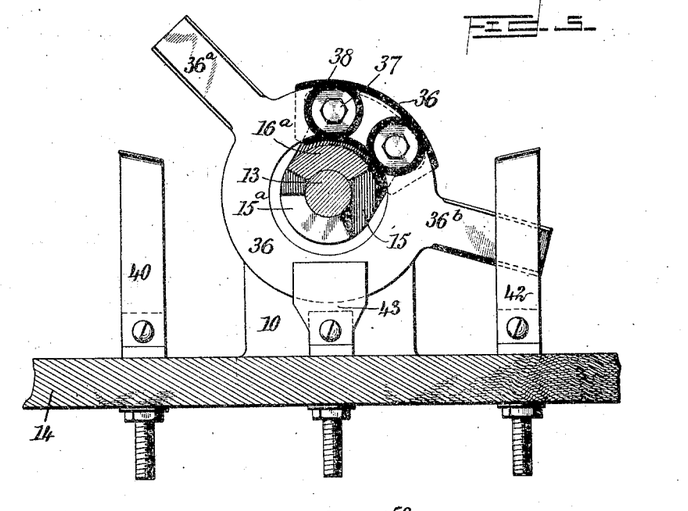
Fig. 6 is a fragmentary section upon the line 6 6 of Fig. 1 looking in the direction of the arrow, certain parts being shown in elevation.
Figure 7:
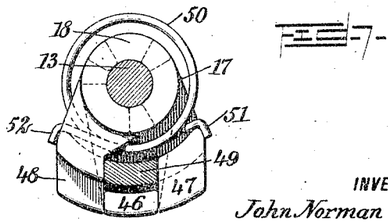
Fig. 7 is a detail section upon the line 7 7 of Fig. 1 looking in the direction of the arrow and showing the spring-tension mechanism for opening and closing certain contacts very rapidly.

The cam 20 is provided with arcuate lugs 27 28, bounded, respectively, by notches 29 30 of substantially semicircular form. The roller 21 normally engages a portion 31 of the cam 20 intermediate of the lugs 27 28; but when the actuating-shaft 13 is turned sufficiently the roller 21 glides outward and engages the exterior of the lug 27 or the lug 28, then moving into engagement with the notch 29 or the notch 30, according to the direction of rotation of the actuating-shaft 13. The roller 21 is mounted upon a pin 21ª, which is held in position by means of a key 21ᵇ. A set-screw 32 confines the sleeve 16 rigidly upon the actuating-shaft 13. The sleeve 15 is provided with lugs 33 34 integral therewith. Mounted, respectively, upon these lugs are contact members 35 36, the member 35 being provided with contact-blades 35ª 35ᵇ and the member 36 being similarly provided with contact-blades 36ª 36ᵇ. The contact members 35 36 are insulated from the lugs 33 34 by insulating-plates 36ᶜ 38 and held in position by bolts 37, so that no part of either contact member 35 36 is in electrical communication with the sleeve 15. Stationary contact members 39, 40, 41, and 42 are mounted upon the plate 14 and are engaged by the respective contact-blades 35ª 36ª 35ᵇ 36ᵇ. The spring-contact members 39 40 are disengaged by the blades 35ª 36ª whenever the spring-contact members 41 42 are engaged by the blades 35ᵇ 36ᵇ. Disposed intermediate of the spring-contact members 40 42 is another spring-contact member 43. Also between the spring-contact members 39 and 41 is another spring-contact member 44. A key 45 may as a precaution be inserted within the sleeve 16 for the purpose of securing it more rigidly upon the actuating-shaft 13. The sleeve 16 is provided with a lug 46 of the shape indicated in Fig. 6. The sleeves 17 18 are respectively provided with lugs 47 48, which normally press upon opposite sides of the lug 49, as will be understood from Fig. 7. This lug 49 is supported by the quick-break sleeve 19. A torsional spring 50, made, preferably, of resilient wire, as shown, is provided at its ends with hooks 51 52, which engage the respective lugs 47 48, so as normally to cause these lugs to engage opposite sides of the lugs 46 and 49. The sleeve 19 is provided with a lug 53 integral therewith, this lug being also integral with the lug 49. An arcuate contact member 54 is mounted upon the lug 53 and is insulated therefrom by means of plates 55 56 of insulating material, the contact member in question being clamped between these plates by the pressure of a bolt 57, which has no metallic communication with the contact member 54. Spring-contact members 58 59 are engaged by the arcuate contact member 54. This arcuate contact member always engages at least one of the two spring-contact members just mentioned and engages both when the switch is in such position as to throw the main current off. The spring-contact members 58 59 are connected with binding-posts 60 61. Integral with the sleeve 19 are lugs 62 63, which support contact members 64 65. The contact member 64 is provided with a contact-blade 64ᵃ and with arcuate-shaped portions 64ᵇ 64ᶜ. The contact member 65 is similarly provided with a contact-blade 65ᵃ and with arcuate portions 65ᵇ 65ᶜ. The contact member 65 is insulated by means of insulating-plates 64ᵈ 65ᶠ, held in position by means of bolts 64ᵉ. Similarly the contact member 65 is insulated by means of plates 65ᵈ 65ᶠ, held in position by bolts 65ᵉ. Disposed within the paths of the contact-blades 65ᵃ 64ᵃ are spring-contact members 66, 67, 68, 69, 70, 71, 72, and 73, as indicated in Fig. 1. Mounted directly below the arcuate member 64 is a spring-contact member 75, adapted to be engaged by the arcuate portions 64ᵇ 64ᶜ, and similarly disposed with reference to the contact member 65 is a spring-contact member 74, adapted to be engaged by the arcuate portions 65ᵇ 65ᶜ, as indicated in Fig. 2. The switch is for the use of direct currents.

Figure 9:
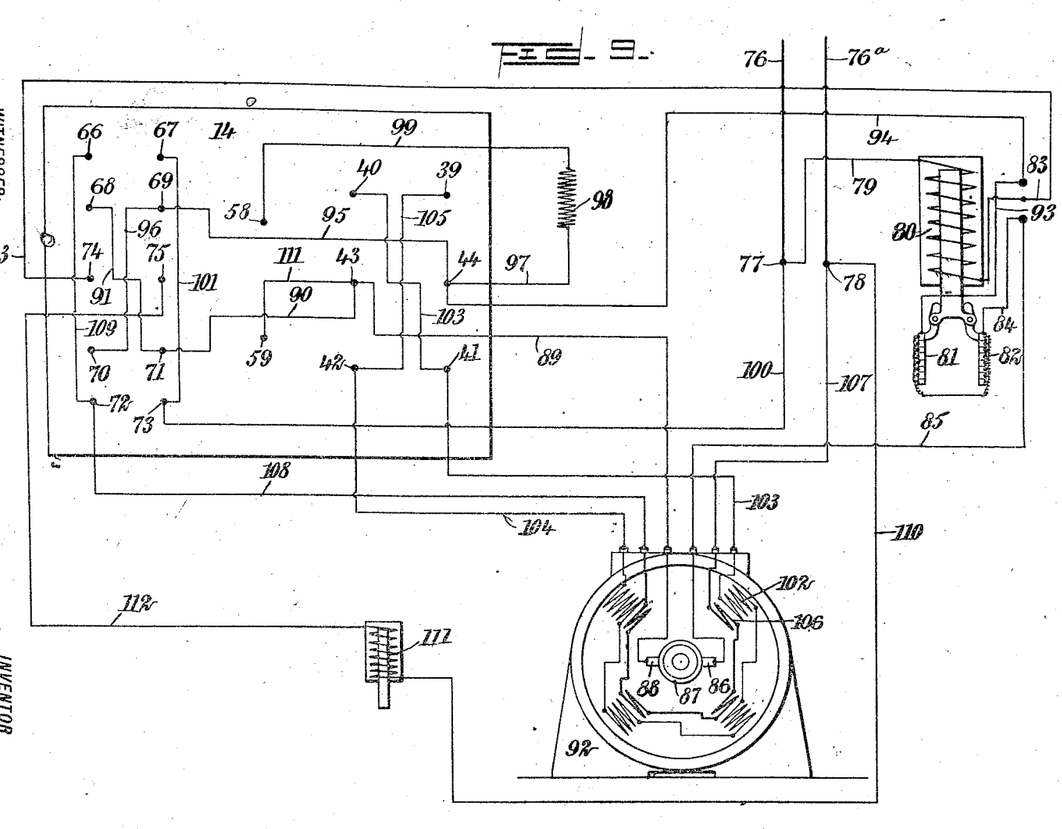
Fig. 9 is a diagram of the wiring.

The mains for supplying the current are shown at 76 76ᵃ in Fig. 9. From a junction 77 upon the main 76 a wire 79 leads to a solenoid 80, which controls an automatic resistance 81 of known construction provided with the usual resistance-coils 82. From the solenoid 80 a wire 83 leads to the spring-contact member 74. From the automatic resistance 81 a wire 84 leads upward and is connected with a wire 85, which leads to the armature-brush 86 of the armature 87. The other brush 88 of the armature is connected by a wire 89 with the contact member 43. From this contact member a wire 90 leads to the contact member 71, which is in turn connected by a wire 91 with the contact member 68. Connected with the automatic resistance 81 is a wire 93, which is in communication with a wire 94, connected with the junction 44. A wire 95 connects the contact member 44 with the contact member 69, the latter being also connected by means of a wire 96 with the contact member 70. From the junction 44 a wire 97 leads to a resistance-coil 98, the latter being connected by a wire 99 with the contact member 58. The purpose of the resistance-coil 98 is to serve as a short circuit for the armature when the current through the same is broken, as hereinafter described. From the junction 77 a wire 100 leads to the spring-contact member 73, the latter being connected by a wire 101 with the similar contact member 67.

The motor is shown at 92 and is provided with shunt-fields 102, which are connected by a wire 103 with the contact members 40 and 41 and also connected by a wire 104 with the contact member 42, from which a wire 105 leads to the contact member 39. The motor is also provided with series field-windings 106, which are connected by a wire 107 with the main 76ᵃ and by a wire 108 with the contact member 72. The contact members 66 72 are connected by a wire 109. From the junction 78 a wire 110 leads to the brake-solenoid 111, and from here a wire 112 leads to the spring-contact member 75. The brake-solenoid is of the usual construction and is for the purpose of releasing the brake when the elevator is started.

Figure 3:
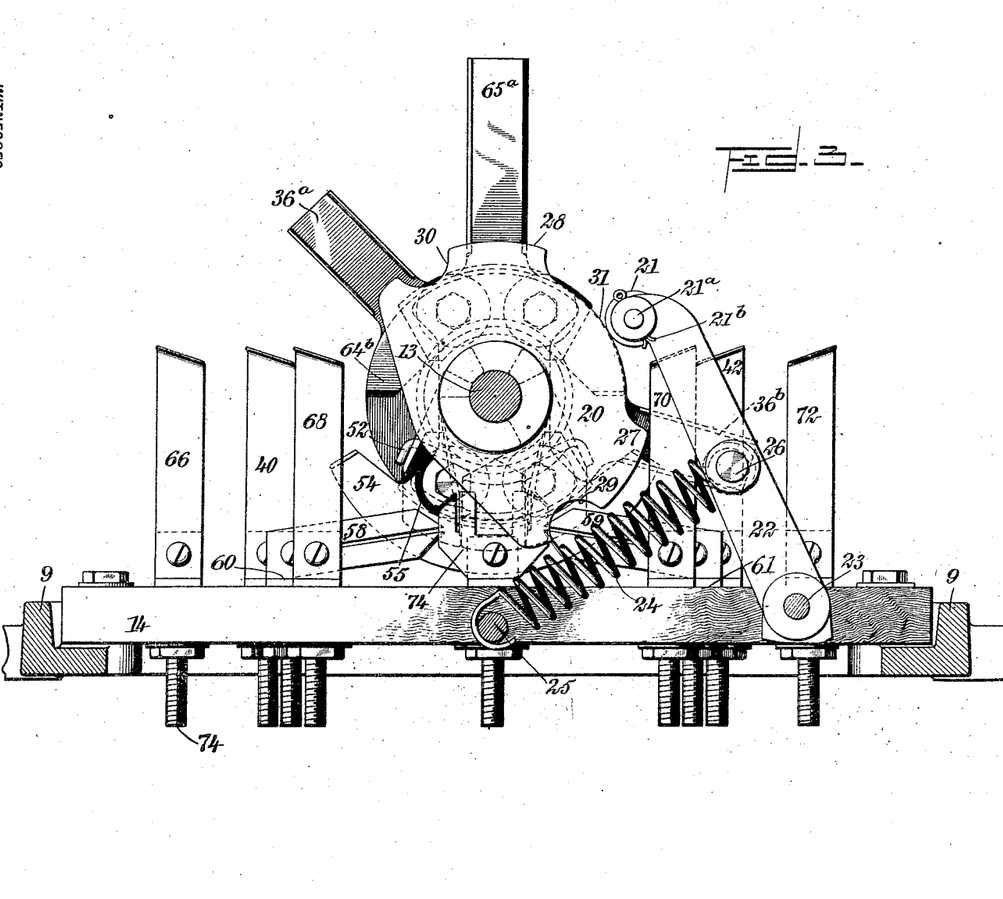
Fig. 3 is a sectional end elevation on the line 3 3 of Fig. 1, showing the apparatus as viewed from the left of Fig. 1.
Figure 4:
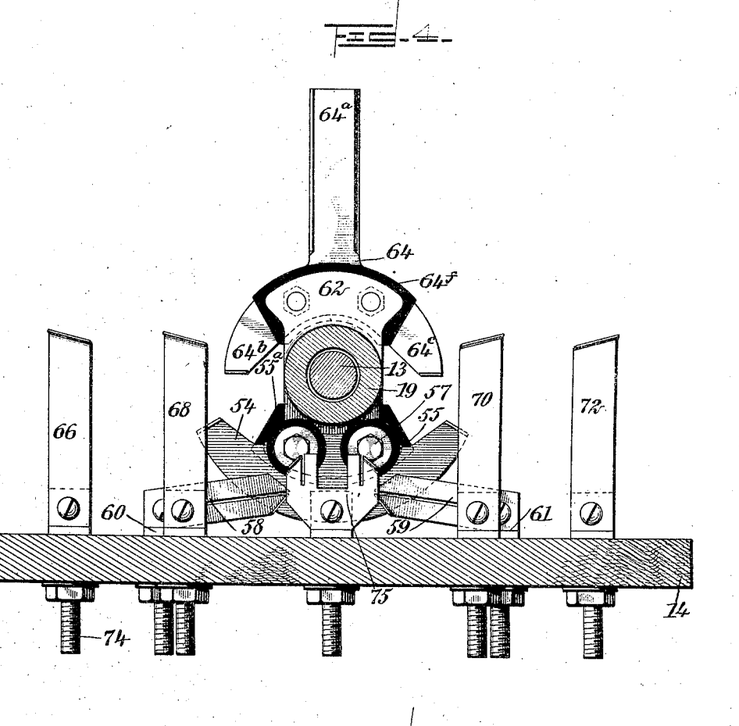
Fig. 4 is a vertical cross-section upon the line 4 4 of Fig. 1 looking in the direction of the arrow.

The operation of my device is as follows: The actuating-shaft 13 is turned in a clockwise direction, as seen from the left of Fig. 1, for the purpose of causing the motor to "go ahead" and is moved in a contra-clockwise direction for the purpose of effecting the reverse movement of the motor. The shaft being rocked beyond a predetermined limit, which is governed by the degree of lost motion between the sleeves 15 and 16, the contact members 35 36 are forced into engagement with the contact members 40 39 or 42 41, according to the direction of movement of the actuating-shaft 13. The contact members 35 36 being in engagement with, say, the contact members 42 41 and the actuating-shaft 13 being rotated in a clockwise direction, as seen from the left of Fig. 1, it follows that the contact-blades 65ᵃ 64ᵃ must engage the contact members 70, 71, 72, and 73. The clockwise rotation of the shaft 13 in causing the sleeve 16 to revolve necessarily causes the lug 46 (see Fig. 2) to press against the lug 48. (See Fig. 7.) Meanwhile the lug 49 is prevented from moving very far because the cam 20 only allows the lug 49 to turn for the moment a predetermined distance. This distance being reached, however, the cam-roller prevents any further movement of the cam until the lug on the sleeve 18 meets the lug on the sleeve 17 and forces the sleeve 19 around against the resistance of the cam-roller. The cam-roller 21 then rides upward upon the arcuate lug 28. This leaves the cam 20, and consequently the sleeve 19, free to move. The spring 50 now being under considerable tension causes the sleeve 18 to move the sleeve 19 as rapidly as possible, and this causes the blades $65^a$ $64^a$ to snap quickly into position. Similarly the shaft 13 being rotated in the opposite direction, the blades $64^a$ $65^a$ snap quickly into the position indicated in Fig. 3, and the rotation being still further continued, these blades snap into the reverse position, in which they engage the contact members 66, 67, 68, and 69. In all cases before the contact-blades $65^a$ $64^a$ make engagement with the respective contact members with which they coact the contact-blades $36^a$ $35^a$ or $36^b$ $35^b$ first engage the contacts 40 39 or 42 41. Suppose, now, that the operator desires to go ahead. He causes the actuating-shaft 13 to be turned to its extreme limit in a clockwise direction, as seen from the left of Fig. 1, as above stated. It will be seen that if the operator should desire to stop and then continue in the same direction the current will be turned off and on without disturbing the sleeve 15, which is never moved except when the direction of rotation of the motor is changed. The several circuits are thus completed.

The so-called "armature-circuit" for the go-ahead movement is as follows: main 76, junction 77, wire 100, contact member 73, contact-blade $64^a$, contact member 71, wire 90, contact member 43, wire 89, armature-brush 88, armature 87, armature-brush 86, wire 85, wire 84, automatic resistance 81, wire 93, wire 94, contact member 44, wire 95, contact member 69, wire 96, contact member 70, blade $65^a$, contact member 72, wire 108, series field-windings 106, wire 107, junction 78 to main $76^a$. This energizes the armature and series field-windings.

The so-called "shunt field-circuit" is as follows: main 76, junction 77, wire 100, contact member 73, contact-blade $64^a$, contact member 71, wire 90, contact member 43, contact-blade $36^b$, contact member 42, wire 104, shunt-field windings 102, wire 103, contact member 41, contact-blade $36^b$, contact member 44, wire 95, contact member 69, wire 96, contact member 70, blade $65^a$, contact member 72, wire 108, series field-windings 106, wire 107, junction 78 back to main $76^a$. This completely energizes all parts of the magnetic field.

The circuit for energizing the starting-solenoid 80 for the go-ahead movement is as follows: main 76, junction 77, wire 79, solenoid 80, wire 83, contact member 74, contact-blades $65^c$ $65^a$, contact member 72, wire 108, series field-winding 106, wire 107, junction 78 back to main $76^a$. This circuit in energizing the solenoid 80 throws out the automatic resistance 81, which controls the main circuit already traced. For releasing the brake in going ahead the brake-solenoid 111 is energized through the following circuit: main 76, junction 77, wire 100, contact member 73, contact-blade $64^c$ $64^a$, contact-member 75, wire 112, brake-solenoid 111, wire 110, junction 78 to main $76^a$. It is necessary, of course, that the brake-solenoid be energized each time the motor is set in motion.

The circuits above traced being fixed in mind, it is easy to understand the analogous circuits made for the purpose of driving the motor in the opposite direction. The actuating-shaft 13 being turned to its extreme limit in a contra-clockwise direction, the main or armature circuit is as follows: main 76, junction 77, wire 100, contact member 73, wire 101, contact member 67, blade $64^a$, contact member 69, wire 95, junction 44, wire 94, wire 93, automatic resistance 81, wire 84, wire 85, armature-brush 86, armature 87, armature-brush 88, wire 89, contact member 43, wire 90, contact member 71, wire 91, contact member 68, blade $65^a$, contact member 66, wire 109, contact member 72, wire 108, series field-windings 106, wire 107, junction 78 and main $76^a$. It will be noted that when the armature-current is reversed, according to the circuit just traced, the series field-windings remain unchanged.

The shunt field-circuit for the reversing movement of the motor is as follows: main 76, junction 77, wire 100, contact member 73, wire 101, contact member 67, contact-blade $64^a$, contact member 69, wire 95, contact member 44, contact-blade $35^a$, contact member 39, wire 105, contact member 42, wire 104, shunt field-windings 102, wire 103, contact member 41, wire 103, contact member 40, contact-blade $36^a$, contact member 43, wire 90, contact member 71, wire 91, contact member 68, blade $65^a$, contact member 66, wire 109, contact member 72, wire 108, series field-windings 106, wire 107, junction 78 to main $76^a$.

The circuit for the starting-solenoid in the reverse motion is as follows: main 76, junction 77, wire 79, solenoid 80, wire 83, contact member 74, contact-blade $65^b$ $65^a$, contact member 66, wire 109, contact member 72, wire 108, series field-windings 106, wire 107, junction 78 to main $76^a$.

The circuit for releasing the brake in the reverse direction is as follows: main 76, junction 77, wire 100, contact member 73, wire 101, contact member 67, contact-blade 64$^b$ 64$^a$, contact member 75, wire 112, brake-solenoid 111, wire 110, junction 78, back to main 76$^a$.

It will thus be noted that I have produced a reversing-switch for the direct control of the operator and capable of running the elevator in each of two directions, the main circuit being opened and closed very quickly.

Having thus described my invention, I claim as new and desire to secure by Letters Patent—

1. In a reversing-switch, the combination of an actuating-shaft, a quick-break sleeve mounted thereupon and provided with contact-blades, stationary contact members disposed within the paths of said contact-blades, spring-tensioned mechanism connected with said quick-break sleeve for causing said contact-blades to snap into and out of engagement with said stationary contact members, a sleeve connected with said actuating-shaft and actuated thereby but having a motion relatively thereto so as to move immediately when said actuating-shaft begins to move, and contact members to be opened and closed by movements of said last-mentioned sleeve.

2. In a reversing-switch, the combination of an actuating-shaft, a quick-break sleeve mounted loosely thereupon, contacts to be opened and closed by movements of said sleeve, spring-controlled mechanism connected with said quick-break sleeve for turning the same rapidly, another sleeve mounted upon said actuating-shaft, contacts controlable by movements of said last-mentioned sleeve, a cam engaging said first-mentioned sleeve and provided with notches, a member engaging said notches and adapted to hold the cam in certain predetermined positions, and a spring for forcing said member against said cam.

3. In a reversing-switch, the combination of an actuating-shaft, a sleeve mounted rigidly thereupon, another sleeve mounted loosely upon said shaft, spring mechanism connecting said sleeves together so as to allow said last-mentioned sleeve to be actuated by the tension of said spring, a cam connected with said last-mentioned sleeve, spring-controlled mechanism for holding said cam in predetermined positions until said spring acquires a certain tension and then causing the release of said cam, quick-break contacts connected with said last-mentioned sleeve and with said cam to be actuated when said cam is thus released, and other contacts controllable by movements of said actuating-shaft, said contacts last mentioned coacting electrically with said contacts first mentioned.

4. In a reversing-switch, the combination of an actuating-shaft, a quick-break sleeve mounted thereon, contacts connected with said quick-break sleeve and opened and closed by movements thereof, a spring-tensioned mechanism for rapidly turning said quick-break sleeve, a sleeve connected with said actuating-shaft and operated thereby but having a limited movement relatively thereto, and contacts to be opened and closed by said last-mentioned sleeve.

5. In a reversing-switch, the combination of stationary contact members, wiring connected thereto, a quick-break sleeve provided with contact-blades for engaging and disengaging said stationary contact members, a spring-controlled mechanism for actuating said quick-break sleeve, an actuating-shaft provided with means for restraining quick-break sleeve while under tension from said spring-controlled mechanism, and means controllable by movements of said actuating-shaft for suddenly releasing quick-break sleeve while the same is thus under tension.

6. In a reversing-switch, the combination of an actuating-shaft, contact members disposed adjacent thereto, mechanism controllable by movements of said actuating-shaft for opening and closing said contacts, a sleeve connected with said actuating-shaft and controllable by movements thereof, said sleeve having a lost motion relatively to said actuating-shaft so as not to move immediately when said actuating-shaft begins to move, spring-controlled mechanism connected with said shaft and with said sleeve so as to tension said sleeve relatively to said shaft, mechanism for temporarily restraining movements of said sleeve relatively to said shaft, and means for suddenly releasing said sleeve while same is thus under tension.

7. In a reversing-switch, the combination of an actuating-shaft, a quick-break sleeve mounted loosely thereon, contacts to be opened and closed by movements of said sleeve, a pair of sleeves journaled loosely upon said shaft and connected together by a spring mechanism controllable by said shaft for turning one of said last-mentioned sleeves while holding the other stationary, mechanism for connecting together said sleeve thus turned and said quick-break sleeve, contacts to be opened and closed by said quick-break sleeve, and other contacts to be opened and closed by movements of said actuating-shaft independently of the movements of said quick-break sleeve, said contacts last mentioned coacting electrically with said contacts first mentioned.

8. In a reversing-switch, the combination of an actuating-shaft, a quick-break sleeve mounted loosely thereon, contacts to be opened and closed by movements of said sleeve, a pair of sleeves mounted loosely upon said shaft and connected together by a spring mechanism controllable by said shaft for turning one of said last-mentioned sleeves while holding the other one stationary, mechanism for connecting together said sleeve thus turned and said quick-break sleeve, and contacts to be opened and closed by said quick-break sleeve.

In testimony whereof I have signed my name to this specification in the presence of two subscribing witnesses.

JOHN NORMAN ANDERSON.

Witnesses:
WALTON HARRISON,
J. W. HANAFORD.